United States Patent

Neri et al.

[11] Patent Number: 5,411,362
[45] Date of Patent: May 2, 1995

[54] METHOD OF PICKING UP STACKED BLANKS

[75] Inventors: Armando Neri, Bologna; Mario Turra, Casalecchio Di Reno, both of Italy

[73] Assignee: G. D. Societa' Per Azioni, Bologna, Italy

[21] Appl. No.: 92,995

[22] Filed: Jul. 19, 1993

[30] Foreign Application Priority Data

Jul. 28, 1992 [IT] Italy .......................... BO92A0029 U

[51] Int. Cl.⁶ ........................ B25J 13/08; B65G 61/00
[52] U.S. Cl. ................................ 414/796.9; 414/783; 414/786; 294/907; 901/46
[58] Field of Search ................ 414/792.9, 783, 786, 414/796, 796.9, 797; 294/907; 901/46, 47

[56] References Cited

U.S. PATENT DOCUMENTS

| | | | |
|---|---|---|---|
| 4,228,886 | 10/1980 | Moran | 901/47 X |
| 4,423,998 | 1/1984 | Inaba et al. | 294/907 X |
| 4,789,295 | 12/1988 | Boucher, Jr. et al. | 294/907 X |
| 4,869,635 | 9/1989 | Krahn | 901/46 X |
| 4,911,608 | 3/1990 | Krappitz et al. | 294/907 X |
| 5,067,013 | 11/1991 | Lindholm et al. | |
| 5,074,745 | 12/1991 | Neri | 414/796.9 |
| 5,102,292 | 4/1992 | Brinker et al. | 414/796 |
| 5,256,030 | 10/1993 | Tanaka et al. | 414/797 X |
| 5,302,079 | 4/1994 | Cestonaro et al. | 414/783 X |

FOREIGN PATENT DOCUMENTS

| | | | |
|---|---|---|---|
| 363722 | 4/1990 | European Pat. Off. | 414/797 |
| 0440915 | 8/1991 | European Pat. Off. | |
| 2630957 | 11/1989 | France | |

OTHER PUBLICATIONS

IBM Technical Disclosure Bulletin. vol. 29, No. 11, Apr. 1987, "Pick-Up Tool With Optical Sensing", pp. 4960–4962.
European Search Report and Annex, Re:EP 93 11 1697.

*Primary Examiner*—William Grant
*Attorney, Agent, or Firm*—Sandler, Greenblum & Bernstein

[57] ABSTRACT

Stacks of blanks arranged in substantially orderly manner on a supporting surface are picked up successively by a powered pickup head for supply to a user machine; the pickup head presenting a pair of intercepting sensors for simultaneously intercepting a given reference edge of the stack when the head is set to the correct pickup position in relation to the stack; and the pickup head being set to the correct pickup position by means of a series of successive rotary and translational movements in the event only one of the sensors intercepts the reference edge of the stack.

6 Claims, 3 Drawing Sheets

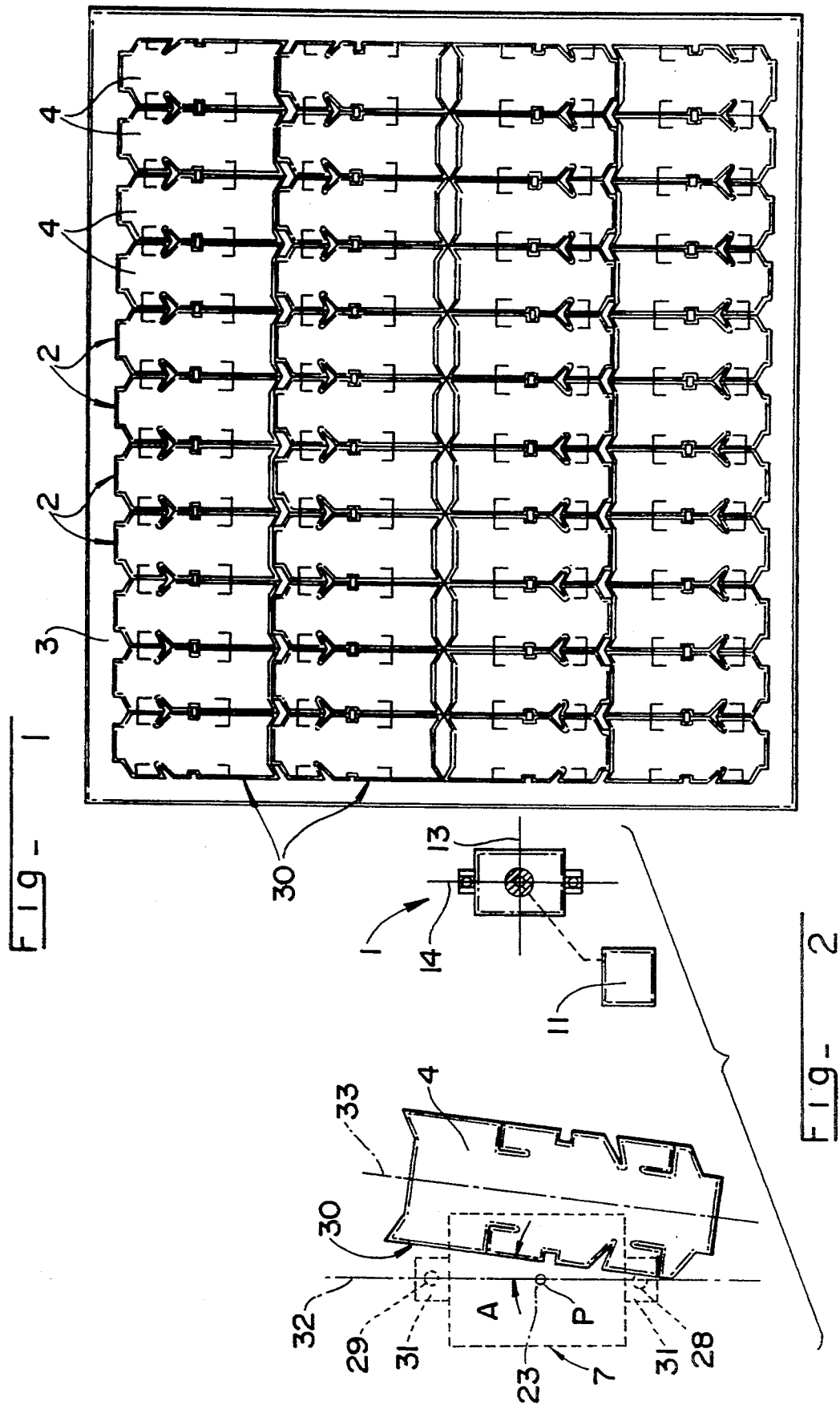

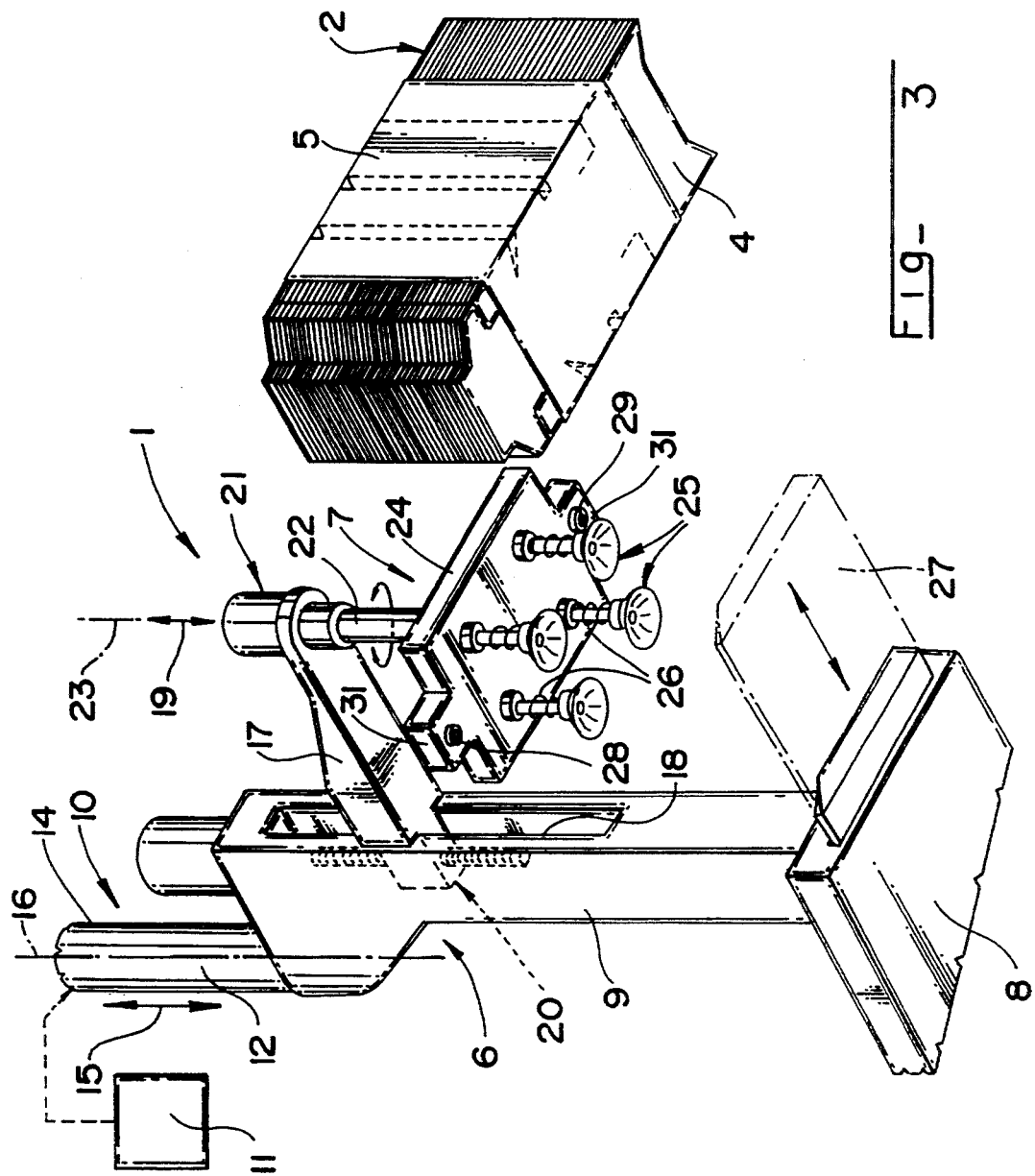

METHOD OF PICKING UP STACKED BLANKS

BACKGROUND OF THE INVENTION

The present invention relates to a method of picking up stacked blanks.

In particular, the present invention relates to a method of picking up stacks of precut blanks off a supporting surface or platform, and feeding the stacks successively to a user machine loading station.

The present invention is particularly suitable for use on cigarette packing machines to which the following description refers purely by way of example.

Stacks of precut blanks from which to form cigarette packets are normally fed to the packing machine by means of pallets on which the stacks are, loaded next to one another in a substantially orderly arrangement known beforehand, and from which the stacks are subsequently removed successively by means of a pickup device. This comprises a powered pickup head designed to positively engage each stack, and controlled by a drive unit in turn comprising a memory unit in which are stored the size of the blanks, the theoretical arrangement of the stacks on the pallet, and the position of the pallet in relation to the pickup device.

As they move over to the packing machine, however, the pallets are subject to jolting, so that the stacks slip slightly out of the original position on the pallet and, as a result, are picked up incorrectly by the pickup device and fed on to the packing machine in a position impairing correct operation of the machine.

SUMMARY OF THE INVENTION

It is an object of the present invention to provide a method designed to overcome the aforementioned drawback, and which, in particular, provides for correctly picking up the stack of blanks even in the event the stack is shifted slightly out of the correct theoretical position.

According to the present invention, there is provided a method of picking up stacks of blanks off a supporting surface by means of a movable pickup head; characterized by the fact that it comprises stages consisting in defining, on said head and by means of a pair of intercepting sensors, a first reference axis having a given orientation; translating said head towards the stack in a given direction in relation to the first axis and until a first of said sensors intercepts a reference edge of the stack; moving the head so as to bring about a corrective shift of the first axis in relation to the stack and until both sensors simultaneously intercept said reference edge; bringing the head into engagement with the stack; and moving the head, together with the stack, so as to restore said given orientation of said first axis.

BRIEF DESCRIPTION OF THE DRAWINGS

A number of non-limiting embodiments of the present invention will be described by way of example with reference to the accompanying drawings, in which:

FIG. 1 shows a partial schematic plan view of a device implementing the method according to the present invention;

FIG. 2 shows a larger-scale view of the FIG. 1 device in a generic operating position;

FIG. 3 shows a larger-scale side view in perspective of a detail in FIG. 1;

DETAILED DESCRIPTION OF THE INVENTION

Figure 4:
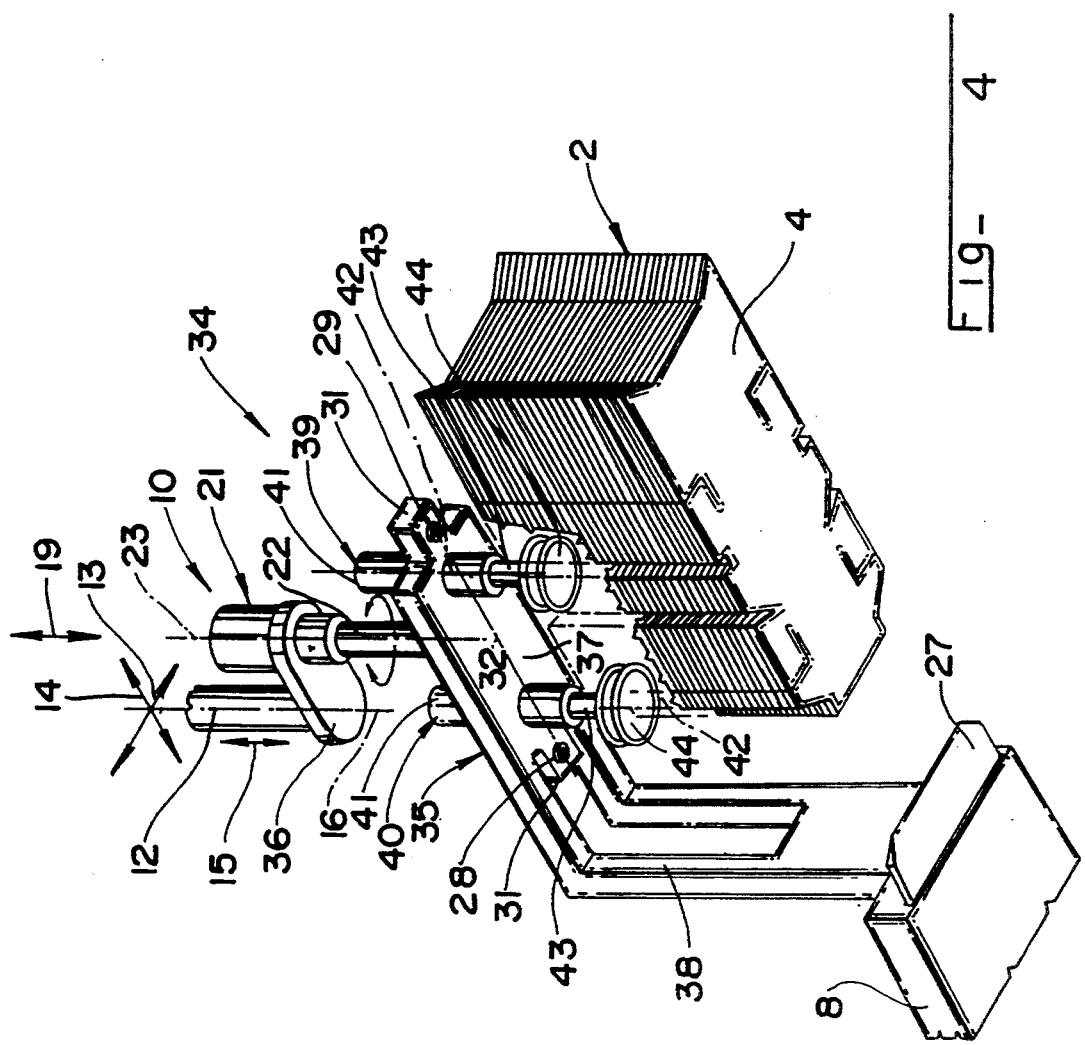
FIG. 4 shows a larger-scale side view perspective of a variation of the FIG. 3 detail.

Number 1 in FIG. 1 indicates a device for picking up stacks 2 arranged adjacent to one another on a supporting platform or pallet 3, and each defined by a number of precut blanks 4 held together by a wrapper 5 (FIG. 3) and from which to form cigarette packets (not shown).

With reference to FIG. 3, device 1 comprises a movable frame 6 designed to approach stack 2 for pickup; and a pickup head 7 fitted to and movable in relation to frame 6, and designed to positively engage wrapper 5 of stack 2 for pickup.

Frame 6 comprises a base 8; and a parallelepiped upright 9 integral with and extending upwards from base 8. Frame 6 is connected to an operating device indicated as a whole by 10 and controlled by a known drive unit 11 in which are memorized the dimensions of blanks 4 and the arrangement of stacks 2 on platform 3.

Operating device 10 consists of a known at least four-axis machine supporting frame 6 by means of a substantially vertical rod 12, and which provides for moving rod 12, together with frame 6, in two horizontal directions 13, 14 perpendicular to each other and parallel to both platform 3 and the FIG. 1 plane, and in a third direction 15 parallel to axis 16 of rod 12, as well as for rotating rod 12 about axis 16.

As shown in FIG. 3, head 7 is connected to frame 6 by an arm 17 extending from upright 9, projecting beyond base 8, and having an end portion extending inside upright 9 and engaging in axially-sliding manner an axial slot 18 formed laterally in upright 9. Arm 17 is moved, in relation to upright 9 and in a direction 19 substantially parallel to direction 15, by a known screw-nut screw device 20 housed inside upright 9.

The free end of arm 17 supports a motor 21, the output shaft 22 of which is movable, with arm 17, in direction 19, and is rotated by motor 21 about its axis 23 parallel to direction 19.

Again with reference to FIG. 3, head 7 comprises a rectangular, substantially horizontal plate 24, the central portion of which is connected integral with the free bottom end of shaft 22, and which rotates with shaft 22 about axis 23, and moves with shaft 22 and arm 17 in direction 19. Head 7 also comprises a number of suction cups 25 extending on the opposite side of plate 24 to shaft 22, and integral with respective shafts movable through plate 24 along respective axes parallel to axis 23 and against the action of respective springs 26.

Again with reference to FIG. 3, device 1 comprises a supporting blade 27 fitted to base 8 and which is moved, in relation to frame 6 and by known actuating means (not shown), between a forward operating position (shown by the dot-and-dash line in FIG. 3) wherein blade 27 is positioned parallel to plate 24 and facing suction cups 25, for supporting stack 2 picked up by head 7; and a withdrawn idle position (shown by the continuous line in FIG. 3) wherein blade 27 is housed inside a cavity formed in base 8.

Head 7 also presents two sensors 28, 29 for intercepting lateral edge 30 of stack 2 for pickup, and enabling correction of the position of head 7 in the event, for any reason, stack 2 for pickup is positioned in other than the correct reference position memorized in drive unit 11.

As shown, particularly in FIG. 2, sensors 28, 29 are supported on respective appendixes 31 on either side of plate 24, and are aligned along a reference axis 32 coinciding with the longer, longitudinal, axis of plate 24 and intersecting axis 23 at point P equidistant in relation to sensors 28, 29. Reference axis 32 is preferably so located that, when head 7 is in the approach position (FIG. 2) facing stack 2 for pickup, axis 32 is parallel to edge 30 if stack 2 is in said correct reference position. In the example shown, when head 7 is in the approach position, reference axis 32 is parallel to direction 14.

Operation of device 1 will now be described as of when operating device 10 sets head 7 to the approach position facing stack 2 for pickup on platform 3. In the approach position, head 7 is positioned with reference axis 32 parallel to edge 30 of stack 2 in the memorized theoretical reference position, blade 27 is in the withdrawn position, and plate 24 is raised (FIG. 3).

In the event stack 2 is set to the memorized theoretical reference position, any translation of frame 6 towards stack 2 causes both sensors 28, 29 to intercept edge 30 simultaneously; and, on intercepting signals being emitted simultaneously by sensors 28, 29, device 1 performs a pickup operation comprising a first movement of frame 6 towards stack 2 in direction 13 to center head 7 over stack 2; a second movement of arm 17 and head 7 towards the top of stack 2 in direction 19, until suction cups 25 engage wrapper 5; a third movement of arm 17 and head 7 in direction 19 to raise stack 2 slightly off platform 3; a fourth forward movement of blade 27 from the withdrawn to the forward position facing the bottom surface of stack 2; and a fifth movement of arm 17 and head 7 in direction 19 to deposit the bottom surface of stack 2 on to blade 27 in the forward position.

Conversely, in the event stack 2 is set to other than the memorized theoretical reference position (FIG. 2), and edge 30 forms an angle A of other than zero with axis 32 of head 7 in the approach position, any translation of frame 6 towards stack 2 causes only one of sensors 28, 29, in this case sensor 28, to intercept edge 30 first.

At this point, device 1 performs an adjusting procedure, which, among other things, provides for rotating head 7 in relation to frame 6 and about axis 23 until axis 32 is parallel to edge 30; and moving frame 6 in direction 13 until both sensors 28, 29 intercept edge 30 simultaneously and so enable a pickup procedure substantially identical to the one already described, except that the rotation of head 7 is memorized and repeated in reverse prior to performing the fifth movement described above. In other words, at the end of this pickup procedure, head 7 is set to the normal approach position, and device 1 may at this point be operated normally for feeding stack 2 into a given position (not shown) on the user machine (not shown), in this case, a packing machine.

In connection with the above, for restoring itself to normal operating mode, in the event the stack is set to other than the memorized theoretical position, device 1 may perform numerous adjusting procedures, two of which are described below by way of example:

EXAMPLE 1

As of the position of head 7 when a first of sensors 28, 29 intercepts edge 30, adjustment, i.e. the operation for achieving simultaneous detection of edge 0 by both sensors 28, 29, is performed by means of "successive approximations" each "approximation" comprising a given rotation of head 7 about axis 23 and a forward movement of frame 6 in direction 13, until at least one of sensors 28, 29 again intercepts edge 30. If said rotation of head 7, which is obviously performed in such a direction as to withdraw from edge 30 the sensor by which edge 30 has been detected, corresponds to a relatively small angle, after a given number of alternating rotations of head 7 and forward movements of frame 6, both sensors 28, 29 will eventually intercept edge 30 simultaneously; and the algebraic sum of the rotations of head 7 is memorized for rotating head 7 in reverse by the same amount during the pickup procedure.

EXAMPLE 2

As of the position of head 7 when a first of sensors 28, 29 intercepts edge 30, adjustment is made by performing a first rotation of head 7 (by angle 2A in the FIG. 2 example) about axis 23, until the other of sensors 28, 29 intercepts edge 30; memorizing the angle by which head 7 is rotated; performing a second rotation (by angle A in the FIG. 2 example) in the opposite direction, until axis 32 is parallel to edge 30; and moving frame 6 in direction 13 until both sensors 28, 29 intercept edge 30 simultaneously.

In the event point P, as in the example shown, is equidistant from sensors 28 and 29, said second rotation angle (A) will equal half said first rotation angle (2A). Conversely, the second rotation angle is given by a known algebraic equation, and is a function of the ratio of the distances of point P from sensors 28 and 29.

The algebraic sum of said first and second rotations is memorized for rotating head 7 in reverse by the same angle (A in the example shown) during the pickup procedure.

The FIG. 4 embodiment relates to a device 34 similar to device 1 and the component parts of which are indicated, wherever possible, using the same numbering system.

Device 34 provides for picking up stacks 2 of blanks 4 not held together by wrapper 5, and comprises a pickup head 35 similar to head 7 and supported on a substantially horizontal bracket 36, which replaces frame 6 and arm 17 of device 1, and is connected integral at one end to the free end of rod 12, so as to move with rod 12 in directions 13, 14 and 15.

At the opposite end to that connected to rod 12, bracket 36 supports motor 21, shaft 22 of which is fitted integral with head 35, which rotates with shaft 22 about axis 23. Head 35 is substantially L-shaped, and comprises a substantially horizontal plate 37 corresponding to plate 24; and a vertical plate 38 extending vertically downwards from an end edge of plate 37, and fitted at its free bottom end to base 8. Base 8 presents movable blade 27, which, in this case, is at a fixed distance from plate 37.

Plate 37, which is also substantially rectangular, and also presents two appendixes 31, is fitted with two sensors 28 and 29, and two actuators 39 and 40 located along axis 32 and symmetrical in relation to axis 23. Each actuator 39, 40 comprises a substantially vertical body 41 integral with and fitted through plate 37 along vertical axis 42; and a rod 43 projecting from body 41 and fitted on the bottom end with a plate 44.

In actual use, head 35 is positioned over stack 2 for pickup as described in connection with device 1, at which point, actuator 39 is operated and respective plate 44 brought into contact with stack 2, so as to partially deform stack 2 by compression and so raise off platform 3 the portion of stack 2 facing plate 38 and not compressed by plate 44.

At this point, blade 27 is moved towards the operating position and partially inserted between platform 3 and stack 2; plate 44 of actuator 39 is raised; blade 27 is moved into the operating position; and both actuators 39 and 40 are operated for gripping stack 2 between plates 44 and blade 27.

We claim:

1. A method for picking up stacks of blanks from a supporting surface by a movable pickup head mounted for rotation about an axis and translation relative to said stacks, said method comprising:

locating a first and second sensor on a first reference axis of said pickup head, said first reference axis being a longitudinal axis of said pickup head substantially perpendicularly intersecting said axis of rotation and having a predetermined orientation;

translating said pickup head towards one of said stacks in a predetermined direction until one of said first and second sensors intercepts a reference edge of said one stack;

moving said pickup head until both said first and second sensors simultaneously intercept said reference edge of said one stack;

moving said pickup head into engagement with said one stack; and moving said pickup head, with said one stack, until said first reference axis is at said predetermined orientation.

2. The method as claimed in claim 1, wherein the step of moving said pickup head until both said first and second sensors simultaneously intercept said reference edge comprises rotating said pickup head at least once about said axis of rotation.

3. The method as claimed in claim 2, wherein the step of moving said pickup head until both said first and second sensors simultaneously intercept said reference edge comprises translating said pickup head at least once towards said one stack in said predetermined direction, memorizing the amount of translation of said pickup head, and moving said pickup head in a direction opposite said predetermined direction, so that said first reference axis is in said predetermined orientation.

4. The method as claimed in claim 1, wherein the step of moving said pickup head until both said first and second sensors simultaneously intercept said reference edge comprises:

rotating said pickup head by a predetermined angle about said axis of rotation, said axis of rotation being located between said first and second sensors; and performing a series of translations towards said one stack and rotations about said axis of rotation until both said sensors simultaneously intercept said reference edge.

5. The method as claimed in claim 1, wherein the step of moving said pickup-head until both said first and second sensors simultaneously intercept said reference edge comprises:

rotating said pickup head in a first direction by a first angle about said axis of rotation so that said second sensor detects said reference edge, said axis of rotation being located between said first and second sensors;

rotating said pickup head in a second direction opposite said first direction about said second axis by a second angle, said second angle being one half said first angle; and translating said pickup head towards said reference edge until both said first and second sensors detect said reference edge.

6. The method as claimed in claim 1, further comprising inserting a supporting element between the one stack and the supporting surface, and holding the one stack on said supporting element.

* * * * *

UNITED STATES PATENT AND TRADEMARK OFFICE
CERTIFICATE OF CORRECTION

PATENT NO. : 5,411,362

DATED : May 2, 1995

INVENTOR(S) : A. NERI et al.

It is certified that error appears in the above-indentified patent and that said Letters Patent is hereby corrected as shown below:

On the title page, item [73],
Assignee: "G.D. Societa' Per Azioni" should be ---G.D Societa' Per Azioni---.

On the title page, item [30],
"Foreign Application Priority Data", "B092A0029 U" should be ---B092A000290 U---.

Signed and Sealed this

Sixth Day of August, 1996

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO. : 5,411,362
DATED : May 2, 1995
INVENTOR(S) : A. NERI et al.

It is certified that error appears in the above-indentified patent and that said Letters Patent is hereby corrected as shown below:

On the title page, in section [30], "Foreign Application Priority Data", change "BO92A0029 U" to ---BO92A 000290---.

Signed and Sealed this

Eighth Day of July, 1997

Attest:

BRUCE LEHMAN

*Attesting Officer*        *Commissioner of Patents and Trademarks*